J. A. DE NOON.
JOINTER GUARD.
APPLICATION FILED MAY 17, 1918.
1,301,401.
Patented Apr. 22, 1919.
2 SHEETS—SHEET 1.
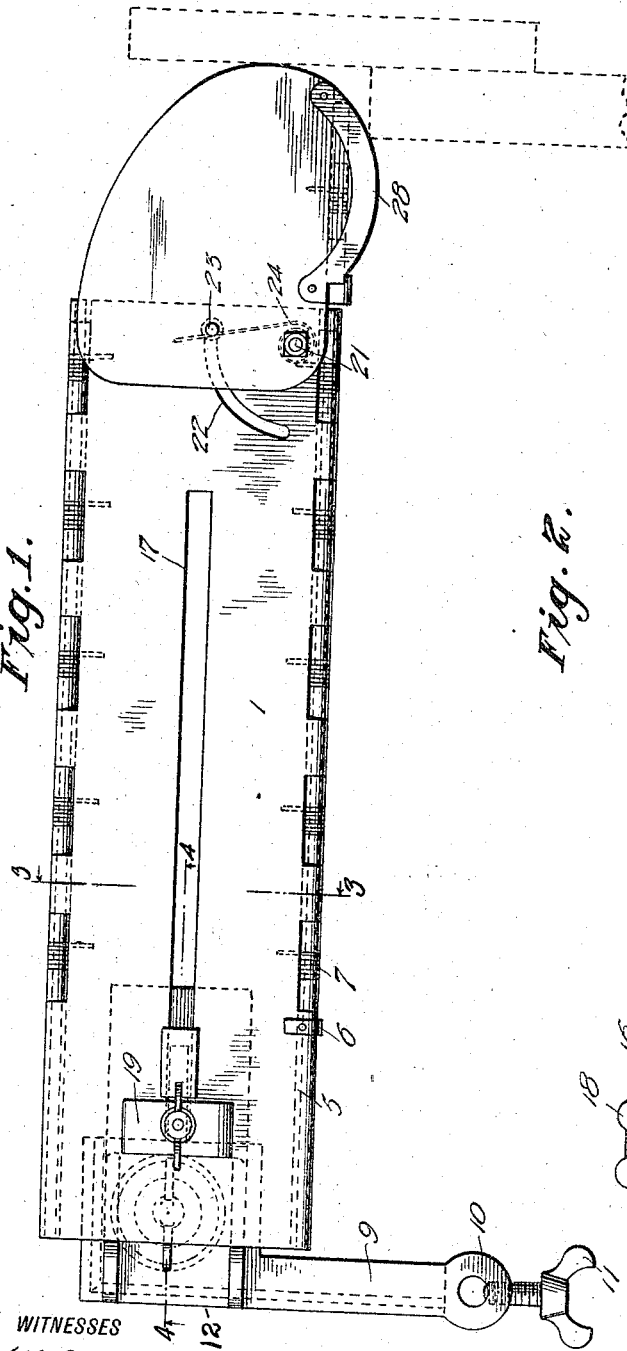
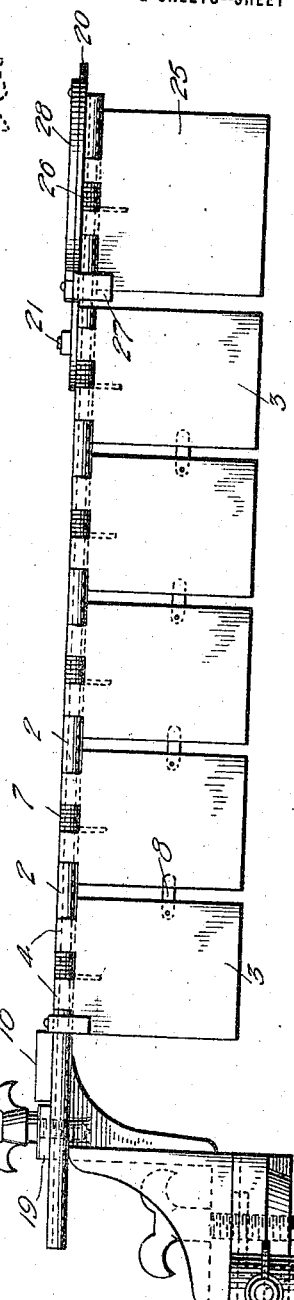
WITNESSES
W. C. Fielding
INVENTOR
John A. DeNoon
BY
ATTORNEYS

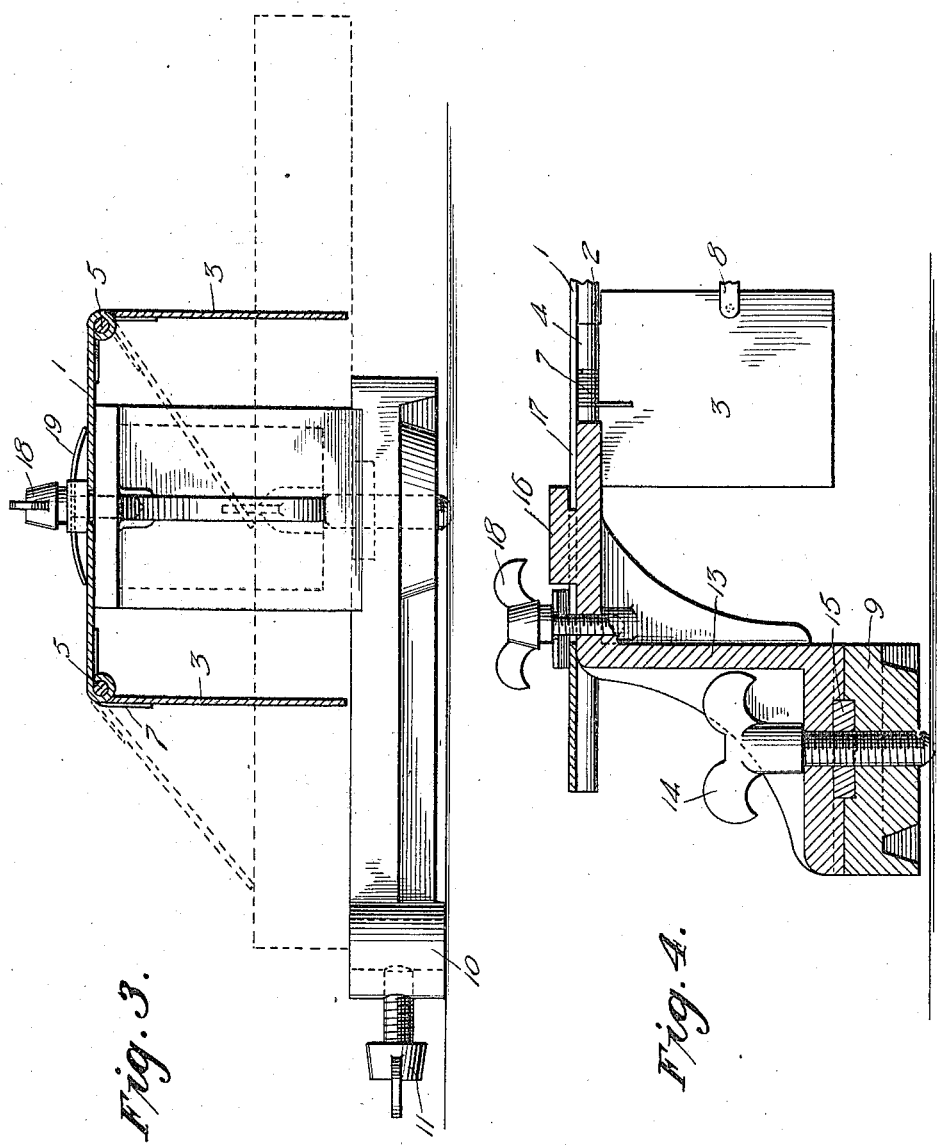

UNITED STATES PATENT OFFICE.

JOHN A. DE NOON, OF BUFFALO, NEW YORK.

JOINTER-GUARD.

1,301,401.  Specification of Letters Patent.  Patented Apr. 22, 1919.

Application filed May 17, 1918. Serial No. 235,163.

*To all whom it may concern:*

Be it known that I, JOHN A. DE NOON, a citizen of the United States, and a resident of Buffalo, in the county of Erie and State of New York, have invented certain new and useful Improvements in Jointer-Guards, of which the following is a specification.

My invention is an improvement in jointer guards, and has for its object to provide a device of the character specified for guarding the cutting blades of a jointer to prevent injury to the fingers of the operator.

In the drawings:—

Figure 1 is a top plan view of the improved guard.

Fig. 2 is a front view,

Figs. 3 and 4 are sections on the lines 3—3 and 4—4, respectively, of Fig. 1, each view looking in the direction of the arrows adjacent to the line.

In the present embodiment of the invention, the guard comprises a plate 1 of suitable width, having at each side alined bearings 2 spaced apart from each other. A series of gates 3 is hinged to each side edge of the plate, the gates having bearings 4 adapted to aline with the bearings 2, to receive a pintle pin or pins 5 for hinging the gates to the plate. At one end of the plate a lug 6 is secured to the plate, the lug lapping over the outer face of the first gate at that end, and this lug limits the swinging movement of the gate outward to a position perpendicular to the plate.

A coil spring 7 is provided in connection with each perpendicular gate, each spring encircling the pintle pin between adjacent bearings 4, and each of these springs has one end engaging the undersurface of the plate 1, and the other end engaging in the face of the adjacent gate. Thus the gates are normally pressed outward, but are limited in their outward swinging movement by the lug 6 and stops 8 in the form of plates which are secured to the gates. One stop is secured to that gate 3 which is adjacent to the lug 6 and this stop is engaged by the succeeding gate. Each gate except that gate remote from the lug 6 has thus a lug 8 for engaging the succeeding gate. The plate is supported by a bracket plate 9, which has at one end a vertical bearing 10 for receiving a rod or standard on the jointer, and a set screw 11 is threaded through the bearing to hold the bracket in adjusted position. At the opposite end from the bearing 10 the bracket has a head 12. An angle bracket 13 is connected with this head by means of a thumb screw 14. This angle bracket consists of a body portion which is vertical, having at each end an arm extending laterally, the arms extending in opposite directions, and one of the arms rests upon the head 12. The set screw 14 is threaded through this arm and through the head, and a key 15 is provided between the parts to prevent rotary movement of the bracket on the head. The upper arm of the bracket 13 has an upstanding lug 16 which is undercut at each side and at one end, and this lug engages a slot 17 extending longitudinally of the plate 1.

A thumb screw 18 passes through the slot into engagement with the bracket, and an arched spring plate 19 is arranged between the thumb screw and the plate, the spring having an opening through which the thumb screw passes, and the ends of the spring plate engaging the plate 1 on opposite sides of the slot. It will be evident that by loosening the thumb screw, the plate may be adjusted longitudinally on the angle bracket. At the end of the plate 1 remote from the bracket 9 a swinging plate 20 is provided, the said plate being pivoted to the plate 1 at the front thereof by means of a bolt and nut 21, in such manner that the plate may swing around in the plane of the plate 1 upon the said plate 1.

The plate 1 has an arc shaped slot 22 concentric with the bolt 21 and the plate 20 has a pin moving in the slot. A spring 24 encircles the bolt, one end engaging the pin 23, and this spring acts to normally hold the plate 20 in the position of Fig. 1, that is in alinement with the plate 1. A gate 25 depends from the plate 20 at the front thereof, the said gate being normally in the plane of the gates 3. A coil spring 26 similar to the spring 7 normally holds the gate vertical, and a lug 27 is provided on the plate 20 for limiting the outward swinging movement of the gate 25. An arc shaped bar 28 is secured to the upper surface of the plate 20 at the front thereof, the bar 28 extending above the spring and the hinge connection of the plate 25 and in front of said connection.

In use, to introduce a piece of wood to the jointing knife, it is pushed beneath the gates as indicated in dotted lines in Fig. 3, the gates swinging to permit passage to the wood. By means of the adjustment 16—17—18 the guard may be moved backward or forward according to the amount of knife the operator is using. Material from one inch to three inches thick may be jointed without raising the guard, and at no time will the knives be exposed, as the gates reach to within ¼ inch of the jointer bed. Only those gates that contact with the piece operated upon are moved, leaving the other gates to protect that part of the knives not in use. In practice, the gates are about two inches wide and that gate on the plate 20 is of greater width than the others, as will be evident from an inspection of Fig. 2.

In factories where jointers are used, there is generally a variety of stock, narrow, wide, thick, and thin, and the operator is obliged to raise and lower the guard according to the thickness, which is time lost. If he, for instance, should set his guard to take three inch stock, the knives on the machine are exposed and leave the operator in danger of being injured. The same applies to edging his stock. He is obliged to move the guard away from the guide on the machine, again leaving that part of the knives exposed at all times. The improved guard can be installed on any machine, and does not need changing for different stock. When it is desired to sharpen the knives, the guard may be swung to one side.

Only the series of gates at the front of the plate 1 have the stops for limiting outward swinging movement, and the springs of the gates at the rear of the plate 1 are arranged to swing the gates inward, as will be evidenced from an inspection of Fig. 3. These gates are limited in their inward swinging movement to a vertical position.

I claim:—

1. A jointer guard comprising a plate, a series of gates hinged to each edge of the plate, all of said gates being hinged to swing freely in one direction only, springs for returning the gates, an extension plate pivoted to one end of the first named plate to swing into alinement therewith, or in superposed position on the first named plate, a spring normally holding the extension plate in alinement, and a gate suspended from the front edge of the extension plate, means for limiting the forward swinging of the gate, said gate being free to swing rearwardly, and a spring for returning the gate.

2. A jointer guard, comprising a plate, a series of gates hinged to each edge of the plate, all of said gates being hinged to swing freely in one direction only, springs for returning the gates, an extension plate pivoted to one end of the first named plate to swing into alinement therewith, or in superposed position on the first named plate, a spring normally holding the extension plate in alinement, and a gate suspended from the front edge of the extension plate.

JOHN A. DE NOON.

Witnesses:
WILLIAM J. KENENDY,
ELIZABETH M. KENNEDY.